(12) United States Patent
Miyadera et al.

(10) Patent No.: US 9,106,861 B2
(45) Date of Patent: Aug. 11, 2015

(54) METHOD AND APPARATUS FOR CONTROLLING ADJUSTMENT OF IMAGE PARAMETERS AND IMAGE FORMATION AND AN IMAGE APPARATUS INCLUDING THE GAME

(71) Applicants: Tatsuya Miyadera, Kanagawa (JP); Hideo Tanaka, Osaka (JP); Keita Yoshikawa, Tokyo (JP); Akinobu Nakamura, Hyogo (JP)

(72) Inventors: Tatsuya Miyadera, Kanagawa (JP); Hideo Tanaka, Osaka (JP); Keita Yoshikawa, Tokyo (JP); Akinobu Nakamura, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/134,384

(22) Filed: Dec. 19, 2013

(65) Prior Publication Data

US 2014/0204429 A1 Jul. 24, 2014

(30) Foreign Application Priority Data

Jan. 22, 2013 (JP) .................................. 2013-009394

(51) Int. Cl.
*H04N 1/40* (2006.01)
*H04N 1/387* (2006.01)

(52) U.S. Cl.
CPC .................................. *H04N 1/3878* (2013.01)

(58) Field of Classification Search
None
See application file for complete search history.

(56) References Cited

U.S. PATENT DOCUMENTS

| 6,657,650 | B1 * | 12/2003 | Omelchenko et al. ........ 347/234 |
| 8,570,594 | B2 * | 10/2013 | Takata et al. ................... 358/1.9 |
| 2008/0038024 | A1 | 2/2008 | Miyadera |
| 2008/0069602 | A1 | 3/2008 | Miyadera |
| 2008/0170868 | A1 | 7/2008 | Miyadera |
| 2008/0212986 | A1 | 9/2008 | Miyadera |
| 2009/0074476 | A1 | 3/2009 | Miyadera |
| 2009/0161142 | A1 | 6/2009 | Miyadera et al. |
| 2009/0185816 | A1 | 7/2009 | Miyadera |
| 2009/0190940 | A1 | 7/2009 | Miyadera |
| 2009/0196636 | A1 | 8/2009 | Miyadera |
| 2009/0220878 | A1 | 9/2009 | Miyadera et al. |
| 2010/0060938 | A1 * | 3/2010 | Kondoh ....................... 358/3.13 |
| 2010/0232817 | A1 | 9/2010 | Miyadera et al. |
| 2010/0239331 | A1 | 9/2010 | Miyadera et al. |
| 2011/0026082 | A1 | 2/2011 | Miyadera et al. |
| 2011/0228364 | A1 | 9/2011 | Miyadera et al. |
| 2011/0229172 | A1 | 9/2011 | Miyadera et al. |
| 2012/0062681 | A1 | 3/2012 | Miyadera et al. |
| 2012/0320427 | A1 * | 12/2012 | Zheng et al. ................. 358/3.26 |

FOREIGN PATENT DOCUMENTS

| JP | 2006-218704 | 8/2006 |
| JP | 2007-088928 | 4/2007 |
| JP | 2009-023213 | 2/2009 |
| JP | 2012-061675 | 3/2012 |

* cited by examiner

*Primary Examiner* — Steven Kau
(74) *Attorney, Agent, or Firm* — Harness, Dickey & Pierce

(57) ABSTRACT

An image forming control device and an image forming control method control an image forming apparatus that forms an image at every scanning line. The image forming control device includes a pixel data generation controller and an image forming mechanism controller. The pixel data generation controller receives data of an image to be formed and an instruction for image formation, and generates image data to be input to an image forming mechanism that forms an image on a recording medium. The pixel data includes data of each pixel that makes up the image to be formed. The image forming mechanism controller controls image formation performed by the image forming mechanism according to the generated pixel data.

9 Claims, 5 Drawing Sheets

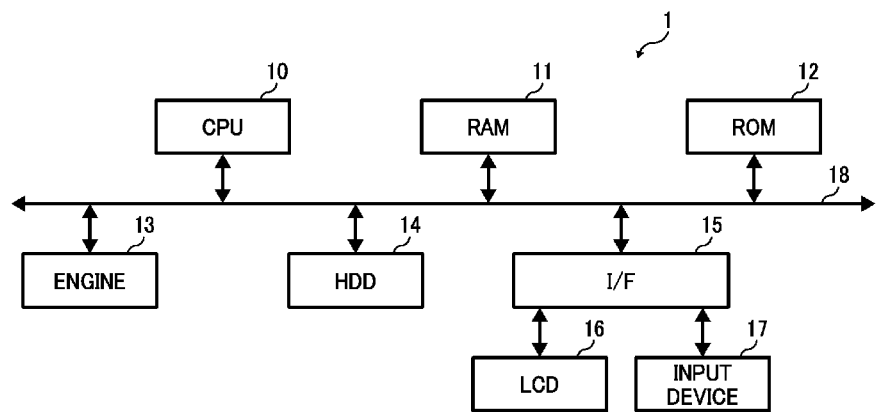
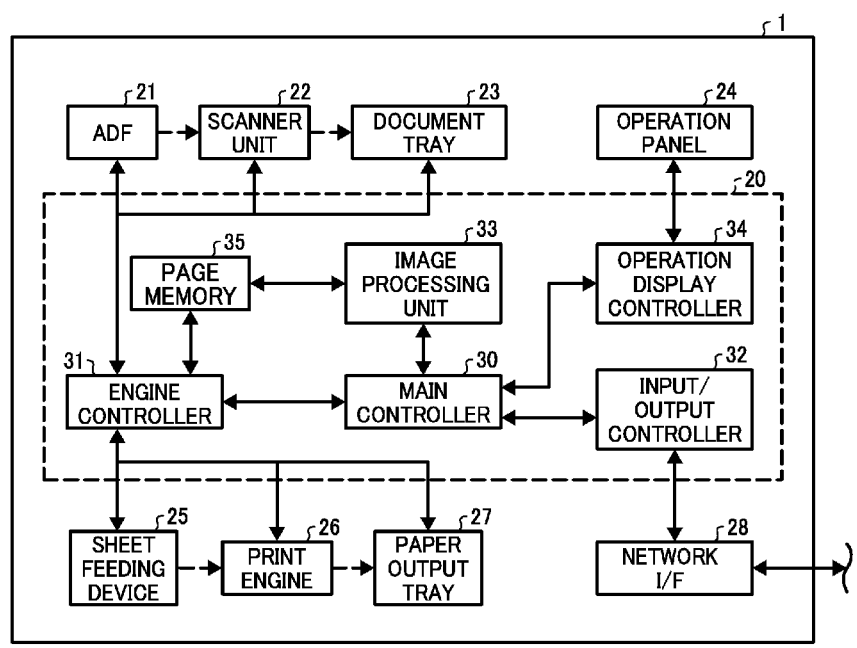

METHOD AND APPARATUS FOR CONTROLLING ADJUSTMENT OF IMAGE PARAMETERS AND IMAGE FORMATION AND AN IMAGE APPARATUS INCLUDING THE GAME

CROSS-REFERENCE TO RELATED APPLICATION

This patent application is based on and claims priority pursuant to 35 U.S.C. §119 to Japanese Patent Application No. 2013-009394, filed on Jan. 22, 2013, in the Japan Patent Office, the entire disclosure of which is hereby incorporated by reference herein.

BACKGROUND

1. Technical Field

Example embodiments generally relate to an image forming control device, image forming apparatus, and image forming control method.

2. Background Art

In recent years, there has been a trend for converting information into electronic form. As a consequence, image processing apparatuses such as printers and fax machines that are used to output the digitized information, and scanners that are used to digitize documents are becoming indispensable. Such image processing apparatuses are usually provided with an imaging function, an image forming function, a communication function, or the like, and are configured as an MFP (multifunction peripheral) that can be used as a printer, facsimile, scanner, and/or copier.

Regarding such image processing apparatuses, electrophotographic image forming apparatuses are widely used for outputting digitized documents. In these electrophotographic image forming apparatuses, an electrostatic latent image is formed by exposing a photoreceptor and the electrostatic latent image is developed by using a developer such as toner to form a toner image. Then, the toner image is transferred to a recording medium such as paper and output.

In such image forming apparatuses, an optical writing device that exposes the photoreceptor includes an LD (laser diode) Raster optical system and an LED (light emitting diode) writing system. The LD Raster optical system includes a light source that emits beams of light to expose the photoreceptor, and a deflective device such as a polygon mirror that deflects the emitted beam to scan the entire photoreceptor. The LED writing system includes an LEDA (LED array) head. The LD Raster optical system is susceptible to errors caused by deformation of an fθ lens or a reflecting mirror, misalignment, or the like. On the other hand, the LED writing system is susceptible to errors caused by deformation of the LEDA head and installation errors.

In the electrophotographic image forming apparatuses, two controllers operate independently. More specifically, one controller controls the entire apparatus, and the other controller controls an image forming mechanism composed of an optical writing device or a photoreceptor. A controller that controls the entire apparatus usually includes a page memory capable of storing pixel data that is equivalent to the data of one page.

SUMMARY

Embodiments provide an image forming control device, an image forming apparatus, and an image forming control method. Each of the image forming control device and the image forming control method controls an image forming apparatus that forms an image at every scanning line, and the image forming control device includes a pixel data generation controller and an image forming mechanism controller. The pixel data generation controller receives data of an image to be formed and an instruction for image formation, and generates image data to be input to an image forming mechanism that forms an image on a recording medium, where the pixel data includes data of each pixel that makes up the image to be formed. The image forming mechanism controller controls image formation performed by the image forming mechanism according to the generated pixel data. The pixel data generation controller includes a page memory configured to hold the pixel data in pages of the image to be formed, and a pixel data output unit configured to read and output the pixel data stored in the page memory upon shifting a main scanning line from which a pixel is read at a specified position on the main scanning line to a sub scanning direction to correct the image skew, based on information related to image skew that occurs in a fixed manner depending on a state in which the image forming mechanism is installed.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

FIG. 1 is a block diagram illustrating the hardware configuration of an image forming apparatus according to an example embodiment of the present invention.

FIG. 2 is a diagram illustrating the functional configuration (structure) of the image forming apparatus of FIG. 1 according to an example embodiment of the present invention.

Figure 3:
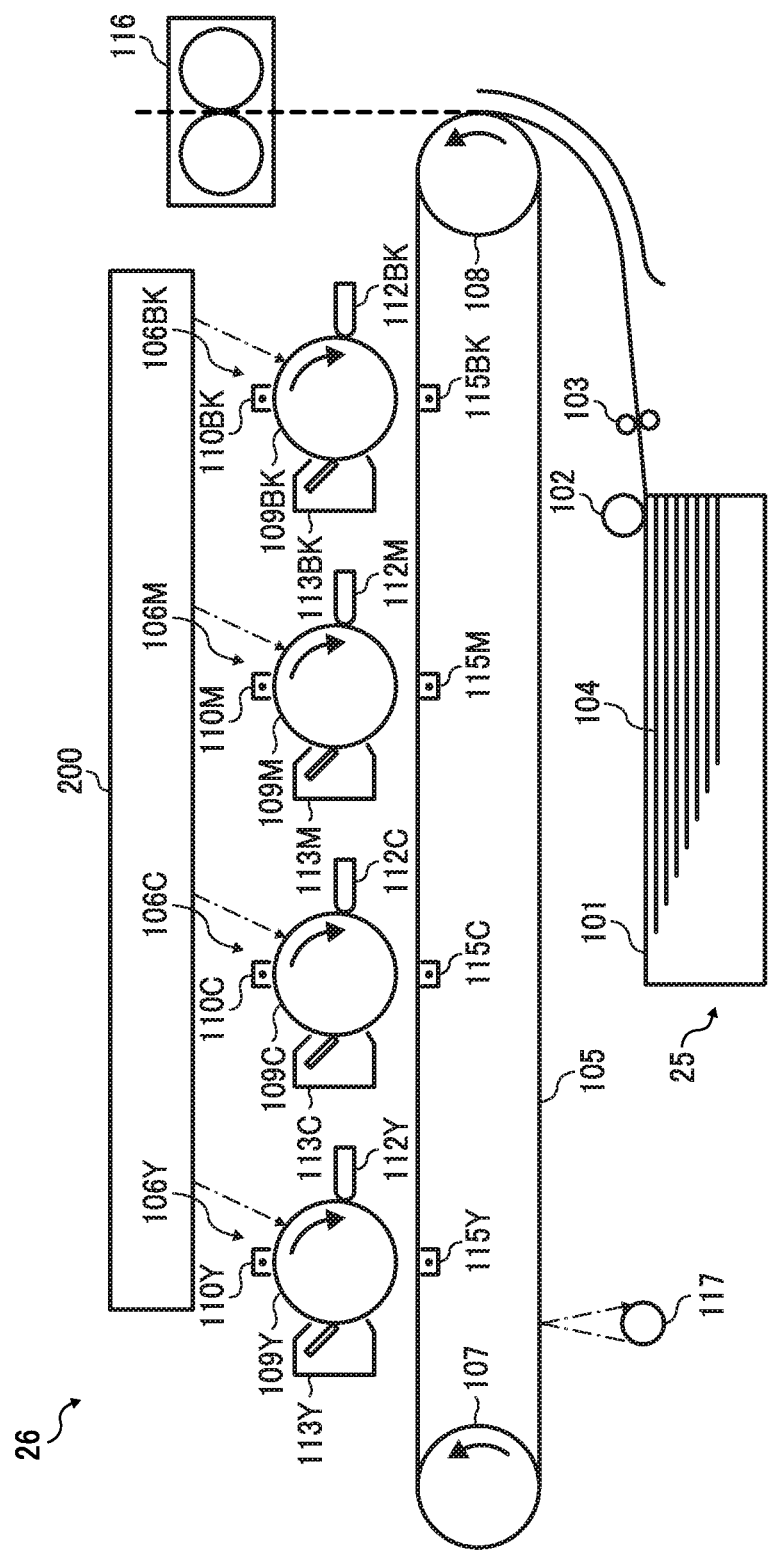
FIG. 3 is a diagram illustrating the structure of a print engine of the image forming apparatus of FIG. 1 according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Example embodiments of the present invention will be described below in detail with reference to the drawings. In an example embodiment of the present invention, an MFP that serves as an image forming apparatus will be described as an example. An MFP includes an image forming unit that forms an image on a sheet of paper by using a developer such as toner or ink, and a controller that generates pixel data to be referred to when an image forming mechanism forms an image according to a print job that serves as an image formation and output command, and the distributed function of the image forming unit and the controller will be described as a feature in an example embodiment. Note that the image forming apparatus is not necessarily an MPF, but may be, for example, a copier, a printer, or a facsimile machine.

FIG. 1 is a block diagram illustrating the hardware configuration of an image forming apparatus 1 according to an example embodiment of the present invention. As illustrated in FIG. 1, the image forming apparatus 1 has an engine 13 that performs image formation, in addition to a configuration similar to that of an information processing terminal such as general-purpose servers or PCs (personal computer). In other words, a CPU (central processing unit) 10, a RAM (random access memory) 11, a ROM (read only memory) 12, the engine 13, a HDD (hard disk drive) 14, and an I/F (interface) 15 are connected to each other via a bus 18 in the image forming apparatus 1 according to an example embodiment of the present invention. Moreover, an LCD (liquid crystal display) 16 and an input device 17 are connected to the I/F 15.

The CPU 10 serves as a computation unit, and controls the entire operation of the image forming apparatus 1. The RAM 11 is a volatile memory capable of reading and writing data at high speed, and is used as a working area when the CPU 10 processes data. The ROM 12 is a read-only nonvolatile memory in which programs such as firmware are stored. The engine 13 functions as an image forming mechanism that actually forms images such as a print engine 26, or an imaging mechanism that reads original images such as a scanner unit 22. As described below referring to FIGS. 3 and 4, the print engine 26, functioning as the image forming mechanism, includes various devices related to image forming.

The HDD 14 is a readable/writable nonvolatile data storage medium in which various kinds of control programs, applications, programs, or the like are stored. The I/F 15 controls connection of various kinds of hardware, networks, or the like to the bus 18. The LCD 16 is a visual user interface used to monitor the state of the image forming apparatus 1. The input device 17 is a user interface such as a keyboard or a mouse used to input data to the image forming apparatus 1.

In such a hardware configuration, programs stored in the ROM 12, the HDD 14, or in another recording medium such as an optical disc are read onto the RAM 11, and the CPU 10 performs computation according to these programs, which configures a software controller. The software controller as configured above and hardware are combined to configure a functional block that realizes the functions of the image forming apparatus 1 according to the example embodiment.

Next, the functional composition of the image forming apparatus 1 according to an example embodiment of the present invention will be described with reference to FIG. 2. FIG. 2 is a block diagram illustrating the functional composition of the image forming apparatus 1 according to an example embodiment of the present invention. As illustrated in FIG. 2, the image forming apparatus 1 according to an example embodiment of the present invention includes a controller 20, an ADF (auto document feeder) 21, the scanner unit 22, a document tray 23, an operation panel 24, a sheet feeding device 25, the print engine 26, a paper output tray 27, and a network I/F 28.

The controller 20 includes a main controller 30, an engine controller 31, an input/output controller 32, an image processing unit 33, an operation display controller 34, and a page memory 35. As illustrated in FIG. 2, the image forming apparatus 1 according to an example embodiment of the present invention is configured as an MFP that includes the scanner unit 22 and the print engine 26. Note that in FIG. 2, electrical connections are indicated by arrows of solid lines, and the flow of recording sheet such as paper is indicated by arrows of broken lines.

The operation panel 24 is an output interface on which the state of the image forming apparatus 1 is visually displayed, and also is an input interface (input device) used to directly operate the image forming apparatus 1 or to input data to the image forming apparatus 1. The network I/F 28 is an interface used to enable the image forming apparatus 1 to communicate with other devices through the network, and Ethernet (registered trademark) or an USB (universal serial bus) interface may be used as the network I/F 28.

The controller 20 is configured by a combination of software and hardware. In particular, a control program such as firmware stored in a nonvolatile memory such as the ROM 12 or the HDD 14 or in a nonvolatile recording medium such as an optical disc is loaded into volatile memory (this will be referred to simply as a memory) such as the RAM 11, and the controller 20 is configured by the combination of a software controller that operates according to the control of the CPU 10 and hardware such as an integrated circuit. The controller 20 serves as a controller that controls the entirety of the image forming apparatus 1.

The main controller 30 controls each element of the controller 20, and gives a command to each element of the controller 20. The engine controller 31 serves as a driving unit that controls or drives the print engine 26 or the scanner unit 22. The input/output controller 32 inputs the signals or commands input through the network I/F 28 to the main controller 30. The main controller 30 controls the input/output controller 32, and accesses other devices through the network I/F 28.

The image processing unit 33 is controlled by the main controller 30. The image processing unit 33 creates drawing information according to printing information included in the input print job, and stores the created drawing information in the page memory 35. The drawing information is information used by the print engine 26, which includes image forming units, to draw an image to be formed in an image forming operation. In fact, the drawing information is bit map data indicating the pixels that make up the image to be formed, i.e., pixel data. The printing information that is included in the input print job is image information that has been converted by a printer driver installed in an information processing device such as a PC into a format that is recognizable by the image forming apparatus 1. As described above, the controller 20 that includes the image processing unit 33 serves as a controller of pixel data generation.

The operation display controller 34 displays data on the operation panel 24, or reports the data input through the operation panel 24 to the main controller 30. The page memory 35 stores drawing information that is equivalent to the data of one page such that the engine controller 31 will be able to input drawing information to the print engine 26 in a stable manner when the engine controller 31 controls the print engine 26 to form and output an image. The engine controller 31 inputs the drawing information stored in the page memory 35 to the print engine 26.

The engine controller 31 according to an example embodiment of the present invention transmits the drawing information to the print engine 26 in accordance with a standard that is generally used in the field of information transmission and reception. Such a general standard includes, for example, a PCI (peripheral component interconnect)-Express, a PCI 32, and an HDMI (high definition multimedia interface).

Note that the engine controller 31 according to an example embodiment of the present invention does not simply output the drawing information stored in the page memory 35 to the print engine 26, but has the function of correcting a skew of an image, shifting the position of an image, and trimming an image, while outputting the data. In other words, the engine controller 31 functions as an image data output unit. Such processing is conventionally performed on the print engine 26 side, but in the example embodiment such processing is performed on the controller 20 side.

In addition to the function of creating drawing information according to a print job as described above, the image processing unit 33 according to an example embodiment of the present invention also has the function of adding a specified pattern to the drawing information created as above, and generating an image pattern for adjusting the print engine 26 as will be described later and storing the created image pattern in the page memory 35. In other words, the image processing unit 33 serves as a pattern generator. Conventionally, such processing is also performed on the print engine 26 side, but in the example embodiment such processing is performed on the controller 20 side.

When the image forming apparatus 1 operates as a printer, firstly, the input/output controller 32 receives a print job through the network I/F 28. The input/output controller 32 transfers the received print job to the main controller 30. When receiving the print job, the main controller 30 controls the image processing unit 33 to create drawing information according to printing information included in the print job.

When the drawing information is created by the image processing unit 33 and is stored in the page memory 35, the engine controller 31 inputs the drawing information to the print engine 26, and controls the sheet feeding device 25 and the print engine 26 to form an image onto the paper conveyed from the sheet feeding device 25. The paper on which the image has been formed by the print engine 26 is ejected to the paper output tray 27.

When the image forming apparatus 1 operates as a scanner, the operation display controller 34 or the input/output controller 32 transfers a scan execution signal to the main controller 30 according to the operation performed on the operation panel 24 or a scan execution command that is input from an external PC or the like through the network I/F 28. The main controller 30 controls the engine controller 31 according to the received scan execution signal.

The engine controller 31 drives the ADF 21 to convey to the scanner unit 22 a document to be scanned which is set to the ADF 21. Then, the engine controller 31 drives the scanner unit 22, and scans the document conveyed from the ADF 21. When a document is directly set to the scanner unit 22 and is not set to the ADF 21, the scanner unit 22 scans the set document according to the control made by the engine controller 31. In other words, the scanner unit 22 operates as an imaging unit.

In an imaging operation, imaging elements such as CCDs included in the scanner unit 22 optically scan a document, and imaging data is generated according to the optical information. The engine controller 31 transfers the imaging data generated by the scanner unit 22 to the image processing unit 33. Under the control of the main controller 30, the image processing unit 33 generates image data based on the imaging data received from the engine controller 31.

It is possible to use the page memory 35 in the controller 20 as a storage area in which imaging data is stored. The image data generated by the image processing unit 33 is stored in a storage medium such as the HDD 14 provided for the image forming apparatus 1, or is transmitted to an external device through the input/output controller 32 and the network I/F 28.

When the image forming apparatus 1 operates as a copier or a facsimile, the imaging data received from the scanner unit 22 or a facsimile interface by the engine controller 31 is stored as drawing information in the page memory 35. In a manner similar to that of the printer operation, the engine controller 31 drives the print engine 26 according to the stored drawing information. When a copying operation is performed or when a receiving operation of facsimile is performed, image processing functions of the image processing unit 33 may also be used.

Next, the composition of the print engine 26 according to an example embodiment of the present invention is described with reference to FIG. 3. As illustrated in FIG. 3, the print engine 26 according to an example embodiment of the present invention has a structure in which image forming units 106 of four colors are arranged along a conveyance belt 105 that is a seamless moving unit. Such a type of print engine is called a tandem type. In other words, a plurality of image forming units (i.e., electrophotographic processing units) 106BK, 106M, 106C and 106Y are arranged, in the order listed from the upstream side of the feeding direction, along the conveyance belt 105, which is an intermediate transfer belt on which is formed an intermediate transfer image to be transferred to paper 104 (i.e., an example of a recording medium), which is separated and fed from a paper feeding tray 101 by a paper feeding roller 102 and a separation roller 103.

These image forming units 106BK, 106M, 106C, and 106Y have a common inner configuration except for the colors of toner images to be formed. The image forming units 106BK, 106M, 106C, and 106Y form a black image, a magenta image, a cyan image, and a yellow image, respectively. In the following description, the image forming unit 106BK will be described specifically. Note that the configuration of the other image forming units 106M, 106C and 106Y are similar to that of the image forming unit 106BK, and thus "BK" that is given to the elements of the image forming unit 106BK will be replaced with reference signs "M", "C", and "Y" in FIG. 3 for the elements of the image forming units 106M, 106C and 106Y and the description will be omitted.

The conveyance belt 105 is an endless belt that runs between a rotating driving roller 107 and a driven roller 108. In other words, the conveyance belt 105 is a seamless belt. The driving roller 107 is rotated by a drive motor, and the drive motor, the driving roller 107, and the driven roller 108 act as a driving unit that moves the conveyance belt 105, which is a seamless moving unit.

When an image is to be formed, the first image forming unit 106BK transfers a black toner image to the rotating conveyance belt 105. The image forming unit 106BK includes elements such as a photoreceptor drum 109BK that serves as a photoreceptor, a charging device 110BK adjacent to the photoreceptor drum 109BK, an optical writing device 200, a development device 112BK, a photoreceptor cleaner, and a discharger 113BK. The optical writing device 200 is configured to emit light to each of the photosensitive drums 109BK, 109M, 109C and 109Y (hereinafter, collectively they will be referred to as photosensitive drums 109).

When an image is to be formed, an outer circumferential surface of the photoreceptor drum 109BK is uniformly charged by the charging device 110BK in the dark, and then writing is carried out on the outer circumferential surface of the photosensitive drum 109BK according to the light that corresponds to the black image emitted from a light source of the optical writing device 200. Accordingly, an electrostatic latent image is formed on the outer circumferential surface of the photoreceptor drum 109BK. The development device 112BK develops the electrostatic latent image into a toner image by using black toner. Accordingly, the black toner image is formed on the photoreceptor drum 109BK.

The toner image is transferred to the conveyance belt 105 by a transfer device 115BK at a position where the photoreceptor drum 109BK comes into contact with or gets closest to the conveyance belt 105 (i.e., at a transfer position). Due to this transferring process, a black toner image is formed on the conveyance belt 105. After the transfer of the toner image is finished, residual toner remaining on the outer circumferential surface of the photoreceptor drum 109BK is wiped off by the photoreceptor cleaner, and then the photoreceptor drum 109BK is discharged by the discharger 113b. Then, the photoreceptor drum 109BK is put on standby for the next image formation.

The black toner image that has been transferred to the conveyance belt 105 by the image forming unit 106BK as described above is then conveyed to the next image forming unit 106M by the rotation of the conveyance belt 105. At the image forming unit 106M, a magenta toner image is formed on the photoreceptor drum 109M in a process similar to that at the image forming unit 106BK, and the toner image is then transferred and superposed on the black image that has previously been formed.

The black and magenta toner image that has been transferred to the conveyance belt 105 is further transferred to the next image forming units 106C and 106Y, and in a similar operation to the above, a cyan toner image formed on the photoreceptor drum 109C and a yellow toner image formed on the photoreceptor drum 109Y are transferred and superposed on the already-transferred black and magenta toner image. By so doing, a full-color intermediate transfer image is formed on the conveyance belt 105.

Sheets of paper 104 stored in a paper feed tray 101 are fed onward in order from top to bottom, and the intermediate transfer image formed on the conveyance belt 105 is transferred to the paper 104 at a position where the conveyance route comes into contact with the conveyance belt 105 or gets closest to the conveyance belt 105. Accordingly, an image is formed onto the paper 104. The paper 104 on which an image has been formed is further conveyed, and the image is fixed at a fixing device 116. Then, the paper 104 is ejected outside the image forming apparatus 1.

In the image forming apparatus 1 described above, there are some cases in which the toner image of each color is not superposed on an appropriate position due to errors such as an error in the cross-axis distance among the photoreceptor drums 109BK, 109M, 109C, and 109Y, an error in parallelism among the photoreceptor drums 109BK, 109M, 109C, and 109Y, an error in the installation of a light source within the optical writing device 200, and an error in the timing of writing electrostatic latent images onto the photoreceptor drums 109BK, 109M, 109C, and 109Y. As a result, misregistration occurs among the colors.

Moreover, there are some cases in which an image is transferred to an area on paper that is misaligned from the area on paper to which the image should be transferred. As causes of such misregistration, causes such as skew, misregistration in the sub-scanning direction, an error in the magnification in the main scanning direction, and misregistration in the main scanning direction are known. Causes such as an error in the rotation speed of a conveyance roller that conveys paper, and an error in the amount of conveyance due to wear and tear are also known.

In the present embodiment, a pattern detection sensor 117 is provided in order to correct such misregistration. The pattern detection sensor 117 is an optical sensor for reading a misregistration correction pattern that has been transferred to the conveyance belt 105 by the photoreceptor drums 109BK, 109M, 109C, and 109Y, and includes a light emitting element for illuminating an adjustment pattern drawn on the surface of the conveyance belt 105 and a light receiving element for receiving the light reflected from the adjustment pattern.

As illustrated in FIG. 3, the pattern detection sensor 117 is supported along a direction perpendicular to the conveyance direction of the conveyance belt 105 on the downstream side of the photoreceptor drums 109BK, 109M, 109C, and 109Y. Further, the pattern detection sensor 117 according to an example embodiment of the present invention is also used as a sensor that reads an adjustment pattern for adjusting changes in density due to aging of the device.

Figure 4:
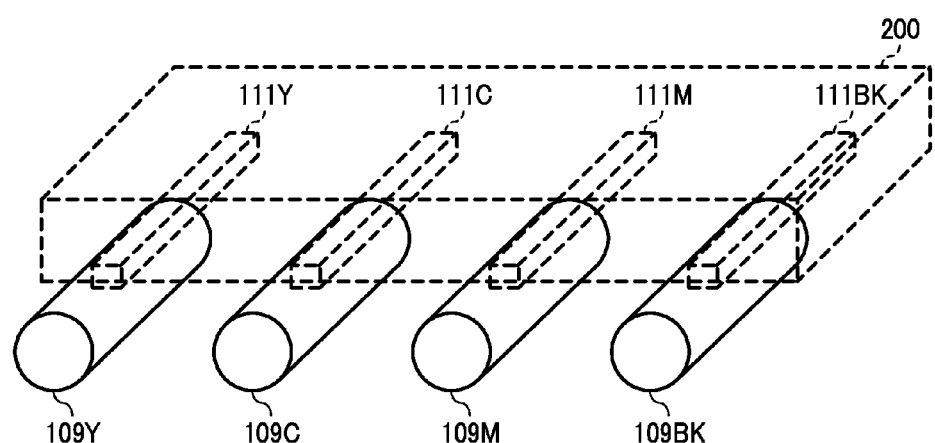
FIG. 4 is a diagram schematically illustrating the structure of an optical writing device of the image forming apparatus of FIG. 1 according to an example embodiment of the present invention.

Next, the optical writing device 200 according to an example embodiment of the present invention will be described. FIG. 4 illustrates how the optical writing device 200 and the photoreceptor drums 109 according to an example embodiment of the present invention are arranged. As illustrated in FIG. 4, the photoreceptor drums 109BK, 109M, 109C, and 109Y are irradiated with light emitted from LEDAs (LED Arrays) 111BK, 111M, 111C, and 111Y (hereinafter, they will be referred to as the LEDA 111 collectively), each of which serves as a light source.

In the LEDA 111, LEDs that serve as light emitting elements are arranged in the main scanning direction of the photoreceptor drums 109. A controller included in the optical writing device 200 selectively exposes the surface of the photoreceptor drums 109 by turning the LEDs arranged in the main scanning direction on and off for every main scanning line according to the data of an image to be output, and thereby forms an electrostatic latent image.

Figure 5:
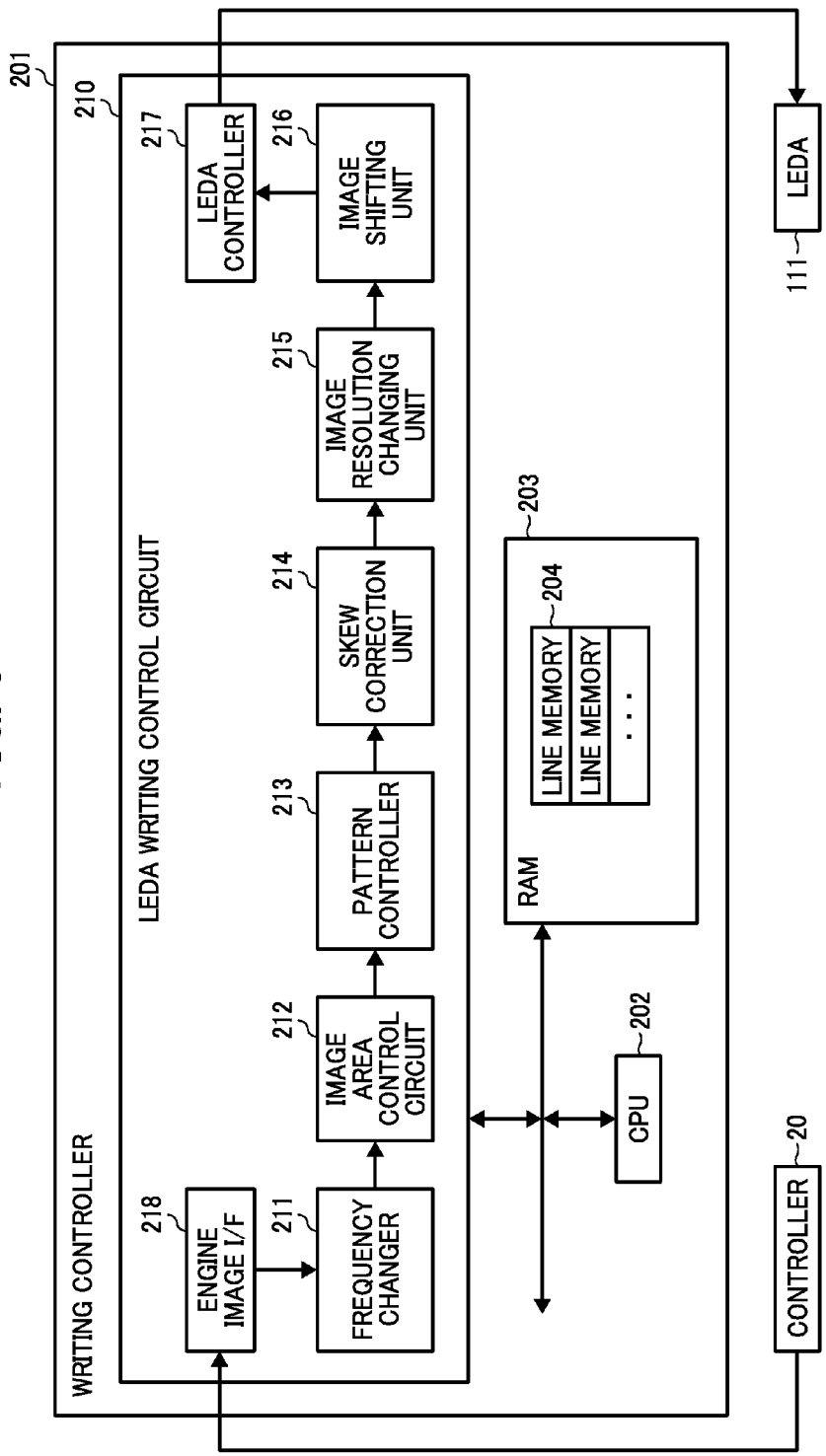
FIG. 5 is a block diagram illustrating the control structure of the optical writing device of the image forming apparatus of FIG. 1 according to an example embodiment of the present invention.

Next, a control block of the optical writing device 200 according to an example embodiment of the present invention is described with reference to FIG. 5. FIG. 5 illustrates how a writing controller 201 that controls the LEDA 111 is configured in the optical writing device 200 according to an example embodiment of the present invention, and how the LEDA 111 and the controller 20 are connected. In other words, in this example embodiment, the writing controller 201 functions as an image forming mechanism controller that controls the LEDA 111 that is a part of the print engine 26 functioning as the image forming mechanism. Further, the controller 20 and the writing controller 201 work together to function as an image forming control device.

As illustrated in FIG. 5, the writing controller 201 according to the example embodiment includes a CPU 202 that controls the entire operation of the optical writing device 200, a RAM 203 that serves as a main memory, a line memory 204 allocated in the storage area of the RAM 203, and an LEDA writing control circuit 210. The LEDA writing control circuit 210 includes a frequency changer 211, an image area control circuit 212, a pattern controller 213, a skew correction unit 214, an image resolution changing unit 215, an image shifting unit 216, an LEDA controller 217, and an engine image I/F 218.

In the image forming apparatus 1 according to an example embodiment of the present invention, it is possible to omit some of the modules included in the LEDA writing control circuit 210 as will be described later. However, such optional modules will be included in the following description to explain the fundamental functions of image formation and output. The LEDA writing control circuit 210 according to the example embodiment is configured by an FPGA (Field-Programmable Gate Array), which is an integrated circuit where the internal circuit configuration can be rewritten.

As described above, the writing controller 201 according to an example embodiment of the present invention is configured by a combination of a software controller and hardware in a similar manner to the hardware configuration described above with reference to FIG. 1. The software controller is responsible for loading a control program stored in a storage medium into the RAM 203 and controlling the CPU 202 to perform computation according to the program.

In the following description, the configuration and function of the writing controller 201 for the LEDA 111 will be described. As described above with reference to FIGS. 3 and 4, the LEDA 111 is provided for each of the photoreceptor drums 109BK, 109M, 109C, and 109Y. In other words, the writing controller 201 is capable of controlling each color of the LEDA 11 and the photoreceptor drum 109, independently.

Note that there are two kinds of methods of processing an image for each color of the LEDA 11 and the photoreceptor drum 109. In one method, data of different formats can be processed for each color. In the other method, only the data of the same format can be processed for each color. In the former method, it is possible to process an image of a different print job for each color. Accordingly, processrun productivity can be improved. In the latter method, it is possible to reduce the scale of the circuit or the signal lines of the LEDA writing control circuit 210. Accordingly, the cost can be reduced.

The LEDA writing control circuit 210 is a light emission controller that controls the light emitted from LEDA 111 according to the drawing information input from the controller 20. The LEDA writing control circuit 210 is configured by hardware such as an integrated circuit, and operates under the control of the CPU 202. The engine image I/F 218 obtains the drawing information that is input from the engine controller 31 of the controller 20 in accordance with a general standard, and converts the drawing information into data format adopted inside the LEDA writing control circuit 210. Then, the drawing information is output.

A line sync signal that indicates a lighting cycle of the LEDA 111, i.e., a line cycle of the LEDA 111, is input to the engine image I/F 218, and the engine image I/F 218 outputs the drawing information whose format has been converted to the frequency changer 211, according to the line sync signal. The frequency changer 211 outputs the drawing information input from the engine image I/F 218 in accordance with the operating frequency of the LEDA writing control circuit 210. For this reason, the frequency changer 211 temporarily stores the drawing information input from the controller 20 in the line memory 204 provided for changing the frequency, and outputs the drawing information according to the operating frequency of the LEDA writing control circuit 210.

The engine image I/F 218 outputs the drawing information according to the line sync signal as described above, and thus at that time the cycle of the drawing information corresponds to the operating frequency of the LEDA writing control circuit 210. Accordingly, the frequency changer 211 may bypass the frequency change, or the frequency changer 211 may be omitted. As described above, the LEDA writing control circuit 210 according to an example embodiment of the present invention is configured by an FPGA. Accordingly, it is easy to achieve such switching of module operations.

The image area control circuit 212 performs a change in image size, trimming, and addition of an internal pattern for the received image data whose frequency has been changed, and also controls the timing of the output of the image data to the pattern controller 213, which is the subsequent processing module, and the position from which pixels are read in the main scanning direction, such that the image area control circuit 212 will correct misalignment in the main scanning direction for every resolution of the drawing data input from the controller 20.

The pattern controller 213 controls the generation of an adjustment pattern, which has been described above. In so doing, the pattern controller 213 obtains data for drawing a pattern from a storage medium provided for the writing controller 201, and outputs the data of pixels that form the pattern. In the case of normal image formation and output operation controlled by the controller 20, the image data input from the image area control circuit 212 is input to the skew correction unit 214 with no particular processing at the pattern controller 213.

The skew correction unit 214 corrects skew on an image, which is caused by various factors including an error in the alignment of the LEDA 111 and the photoreceptor drums 109. Parameter values for skew correction are stored in a memory of the writing controller 201, and these parameter values are set to the skew correction unit 214 under the control of the CPU 202. The skew correction unit 214 stores the image data input from the pattern controller 213 in the line memory 204 for every main scanning line, and reads image data from the line memory 204 in accordance with the set parameter value. By so doing, skew correction is achieved.

The image resolution changing unit 215 changes the resolution of the image data whose skew has been corrected by the skew correction unit 214 in the main scanning direction and the sub-scanning direction. The image data read from the line memory 204 by the skew correction unit 214 is written in a part of the line memory 204 dedicated to the image resolution changing unit 215. The image resolution changing unit 215 changes the image resolution by reading image data from the line memory 204 in accordance with a parameter for resolution change set by the CPU 202.

When the image resolution is changed, for example, in the sub-scanning direction, the image resolution changing unit 215 repeatedly reads the image data stored in the line memory 204 according to the scale of the resolution. For example, the resolution of the drawing data input from the controller 20 is 600 dpi according to the example embodiment. When it is desired that the resolution be 1200 dpi, i.e., twice the resolution that is input from the controller 20, in the sub-scanning direction, the image resolution changing unit 215 reads the image data of one line twice. When it is desired that the resolution be 2400 dpi, i.e., four times the resolution that is input from the controller 20, the image resolution changing unit 215 reads the image data four times.

When the image resolution is changed in the main scanning direction, the image resolution changing unit 215 repeatedly outputs the image data of one pixel stored in the line memory 204 according to the scale of the resolution. When it is desired that the image data of 600 dpi be changed to that of 1200 dpi, the image resolution changing unit 215 outputs the image data of one line twice.

As the skew correction unit 214 and the image resolution changing unit 215 are arranged as two distinct modules in the example embodiment of the present invention, a storage area is allocated in the line memory 204 for each module, and image data is written in and read from the line memory 204 twice. Alternatively, skew correction and resolution change may be performed at the same time.

In other words, when image data stored in the line memory 204 is to be read, the line from which the image data is read is shifted at a specified position in the main scanning direction according to a parameter for skew correction which is set by the CPU 202, and at the same time image data of one line is repeatedly read and image data of one pixel is repeatedly output according to a parameter for skew correction. Due to such processes, it becomes possible to reduce the writing and reading processing of image data in/from the line memory 204, and the capacity of a storage area to be allocated for the line memory 204 in the RAM 203 may also be reduced.

When image data is input to the LEDA controller 217, the image shifting unit 216 adjusts the timing of transfer of the pixel data output from the image resolution changing unit 215. By so doing, precise misregistration correction may be achieved in a unit of the post-changed resolution. In regard to the adjustment of the timing in which the pixel data is transferred, timing is adjusted according to the direction to which the image is slid (shifted).

For example, when misregistration in the main scanning direction is to be corrected, the timing of transfer of the image data to the LEDA controller 217 is adjusted. If the direction of the timing adjustment is limited to delay the timing of the transfer in the above correction process, it becomes possible to configure the image shifting unit 216 using a simple flip-flop circuit, thereby achieving simplification of the circuit.

For example, when misregistration in the sub-scanning direction is to be corrected, the image shifting unit 216 stores the image data output from the image resolution changing unit 215 in a part of the line memory 204 allocated for image shifting unit 216, and adjusts the timing in which the image data is read and transferred to the LEDA controller 217 in a unit of the post-changed resolution. The LEDA controller 217 controls the LEDA 111 to emit light according to the image data output from the image shifting unit 216, thereby selectively exposing the surface of the photoreceptor drum 109.

In such a configuration, the image processing unit 33 of the controller 20 performs the image processing that is conventionally performed by the LEDA writing control circuit 210, in particular, the processing that is performed by the image area control circuit 212, the pattern controller 213, and the skew correction unit 214. Accordingly, the scale of the circuit of the LEDA writing control circuit 210 can be reduced, and the storage area of the RAM 203 that serves as the line memory 204 can effectively be utilized.

As described above, causes of skew that is to be corrected by the skew correction unit 214 include a fixed factor such as an error in the alignment of the LEDA 111, which serves as a light source, and the photoreceptor drum 109, which is caused due to the state in which an image forming mechanism is installed, and also includes a variable factor such as an environmental condition, e.g., how/where the image forming apparatus 1 is used. In an image forming apparatus according to an example embodiment of the present invention, the image processing unit 33 adjusts an item of skew caused due to the fixed factor from among the items of skew to be corrected by the skew correction unit 214.

A parameter for adjusting skew that is caused due to the fixed factor mentioned above (hereinafter, this parameter will be referred to as "fixed skew correcting parameter") is measured after the LEDA 111 and the photoreceptor drums 109 are installed in the image forming apparatus 1, and the measured parameter is stored in a storage medium provided for the writing controller 201. The engine controller 31 of the controller 20 obtains a fixed skew correcting parameter stored on the writing controller 201 side, and performs skew correction in accordance with the parameter.

On the other hand, the skew correction unit 214 provided for the LEDA writing control circuit 210 adjusts skew caused due to the variable factor. A parameter for adjusting skew that is caused due to the variable factor (hereinafter, this parameter will be referred to as "variable skew correcting parameter") is generated when the pattern detection sensor 117 detects the adjustment pattern as described above.

The fixed factor is dominant compared with the variable factor if the degree of skew is considered. In other words, the amount of skew caused due to a fixed factor is greater than the amount of skew caused due to a variable factor. When the skew correction unit 214 adjusts skew, for example, when skew of ten lines is occurring in the entirety of the main scanning direction, ten lines of the line memory 204 are allocated for the skew correction unit 214.

By contrast, image data of one page is held in the page memory 35 on the controller 20 side. Accordingly, skew correction of any number of lines may be performed by shifting the line in which image data is read when the image data is read from the page memory 35.

The amount of skew caused due to a variable factor is smaller than the amount of skew caused due to a fixed factor, and thus the number of lines of the line memory 204 to be allocated for the skew correction unit 214 is small. Accordingly, the scale of the LEDA writing control circuit 210 can be reduced, or a greater amount of memory can be allocated for other modules.

Figure 6:
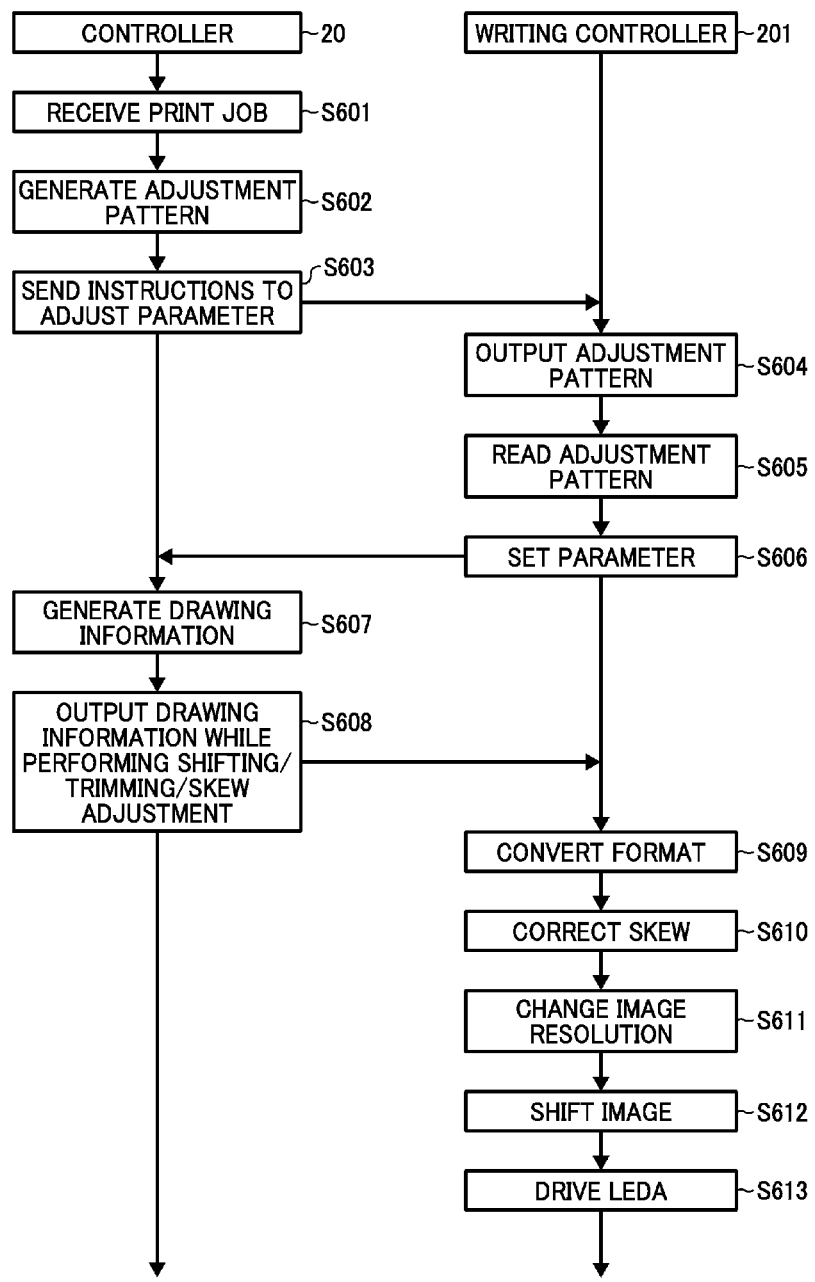
FIG. 6 is a sequence diagram illustrating the operation of forming and outputting an image according to an example embodiment of the present invention.

FIG. 6 is a sequence diagram illustrating the operations of the controller 20 and the writing controller 201, respectively, in the operation of forming and outputting an image according to an example embodiment of the present invention.

Firstly, as illustrated in FIG. 6, the main controller 30 of the controller 20 receives a print job through the input/output controller 32 (S601). Upon receiving a print job, the main controller 30 controls the image processing unit 33 to generate an adjustment pattern for generating and updating parameters used for skew correction, misregistration correction, density correction, or the like performed at the print engine 26 (S602). In S602, the image processing unit 33 writes the drawing information of a predetermined adjustment pattern to the page memory 35, in a similar manner to the process of writing drawing information to the page memory 35 in ordinary operation of forming and outputting an image.

When an adjustment pattern is generated on the controller 20 side as described above, it is possible to use the page memory 35, which is capable of storing drawing information in pages. Accordingly, it becomes possible to use an image that has been formed on a page-by-page basis, as an adjustment pattern. Such images that have been formed on a page-by-page basis can be stored in a mass storage device such as the HDD 14.

On the other hand, as described above with reference to FIG. 5, it is difficult for the writing controller 201 to include memory such as the page memory 35, which is capable of storing drawing information in pages. For this reason, when an adjustment pattern is generated by the pattern controller 213, only simple patterns can be generated under certain rules.

Accordingly, an adjustment pattern is generated on the controller 20 side and is output to the print engine 26 as drawing information, in a similar manner to an ordinary process of forming and outputting an image. By so doing, an adjustment pattern that has been generated on a page-by-page basis can be used, and parameters may be adjusted more effectively.

Once the image processing unit 33 writes the drawing information of an adjustment pattern to the page memory 35, the main controller 30 controls the engine controller 31 to send instructions to adjust a parameter to the print engine 26 (S603). Accordingly, the drawing information written into the page memory 35 is input to the print engine 26 in a similar manner to an ordinary operation of forming and outputting an image.

Note that preferably skew correction is performed for the drawing information of the adjustment pattern that has been generated in S602 and that is to be sent to the print engine 26 in S603 in accordance with a fixed skew correcting parameter that is reported in advance from the print engine 26 to the controller 20. By so doing, the skew caused to an adjustment pattern when an image is formed and output is limited to the skew caused due to a variable factor. Accordingly, an adjustment parameter for the skew caused due to a variable factor, i.e., a variable skew correcting parameter described above, will be generated in the process of generating an adjustment parameter performed by the print engine 26.

In the print engine 26, the writing controller 201 forms and outputs an image according to the drawing information of the adjustment pattern, in response to the instructions to adjust a parameter input from the controller 20 (S604). Once an image is formed and output according to the adjustment pattern, the writing controller 201 obtains from the pattern detection sensor 117 the result of the reading process of the adjustment pattern that is formed onto the conveyance belt (S605), and configures an adjustment parameter according to the result of the obtaining process (S606).

In S606, moreover, the writing controller 201 reports to the controller 20 the generated adjustment parameter or a fixed skew correcting parameter that is configured in advance as described above. Note that the fixed skew correcting parameter may be stored in the controller 20 in advance, instead of storing it at S606.

In order to generate an adjustment pattern for which skew correction has been performed based on a fixed skew correcting parameter, the fixed skew correcting parameter is reported to the controller in advance. This may be achieved by storing the fixed skew correcting parameter on the controller 20 side, or alternatively, the controller 20 may be configured to obtain the fixed skew correcting parameter from the print engine 26, for example, when S602 of FIG. 6 is performed.

Subsequent to the instructions to adjust a parameter given to the print engine 26, the main controller 30 of the controller 20 controls the image processing unit 33 to generate drawing information according to a print job (S607). Accordingly, the drawing information of an image to be printed is written to the page memory 35.

Once the drawing information of an image to be output is written to the page memory 35, the main controller 30 controls the engine controller 31 to read the drawing information written to the page memory 35 and to send the read drawing information to the print engine 26. On this occasion, the engine controller 31 reads drawing information from the page memory 35 such that shifting, trimming, and skew correction will be performed in the main and sub scanning direction of the image (S608).

In S608, the engine controller 31 reads drawing information from the page memory 35 such that a shifting process, a trimming process, and a skew correction process will be performed in accordance with the parameter obtained from the writing controller 201 in S606. Note that these shifting and trimming processes are performed by the image area control circuit 212, which is described above with reference to FIG. 5. As the shifting process and trimming process are performed by the controller 20, it becomes possible to omit the image area control circuit 212 of the LEDA writing control circuit 210.

Once an image to be output has been input to the writing controller 201 as described above, the engine image I/F 218 of the writing controller 201 converts the format of the image (S609), and transfers the image data to the subsequent module. The frequency changer 211 that has received the image data from the engine image I/F 218 transfers the image data to the subsequent stage such that the image data will correspond to the operating frequency of the LEDA writing control circuit 210.

The image data output from the frequency changer 211 is input to the skew correction unit 214, bypassing the image area control circuit 212 and the pattern controller 213. The skew correction unit 214 corrects skew in accordance with the variable skew correcting parameter described above (S610), and transfers the image data to the subsequent stage, i.e., the image resolution changing unit 215. In other words, the skew correction unit 214 serves as a unit that adjusts variable skew. The image resolution changing unit 215 that has obtained image data from the skew correction unit 214 changes the image resolution by performing the processes as described above (S611), and transfers the image data to the subsequent stage, i.e., the image shifting unit 216.

The image shifting unit 216 that has obtained image data from the image resolution changing unit 215 shifts the image in units of the resolution changed by the image resolution changing unit 215, by performing the processes as described above (S612), and transfers the image data to the subsequent stage, i.e., the LEDA controller 217. In other words, the image shifting unit 216 serves as a unit that corrects the misregistration of an image in units of the post-changed resolution. The LEDA controller 217 that has obtained the shifted image data drives the LEDA 111 in accordance with a line sync signal (S613). By performing such processes as described above, the operation of forming and outputting an image according to an example embodiment of the present invention is completed.

As described above, in the image forming apparatus 1 according to an example embodiment of the present invention, the controller 20 adjusts the skew caused due to a fixed factor according to a fixed skew correcting parameter sent from the print engine 26. Accordingly, the print engine 26 only has to correct the skew in accordance with the variable skew correcting parameter that has been generated according to the result of the adjustment pattern detection, and the capacity of the line memory to be allocated for the other correction process may be reduced. In other words, the hardware included in the image forming apparatus 1 is optimized, and the manufacturing cost may be reduced with no functional loss.

Moreover, in the image forming apparatus 1 according to an example embodiment of the present invention, a shifting process or a trimming process are performed by the controller 20, and thus the process by the image area control circuit 212 of the LEDA writing control circuit 210 may be omitted, thereby improving transfer efficiency. Such improvement in the transfer efficiency is achieved by bypassing the image area control circuit 212, and such bypassing is easily achieved because the LEDA writing control circuit 210 according to the example embodiment is configured by an FPGA.

If the image area control circuit 212 is bypassed, a portion of the line memory 204 to be allocated for the image area control circuit 212 can be omitted. Thus, the capacity of the line memory can be reduced in a similar manner to the case of the skew correction unit 214 described above. If the number of pieces of line memory is reduced as described above, the capacity of the RAM 203 can be reduced, and the scale or the manufacturing cost of the writing controller 201 may also be reduced.

In addition to a case in which the reduced amount of the line memory is managed as reduction in capacity, the reduced amount of the line memory may also be allocated for another module of the LEDA writing control circuit 210. For example, if the reduced amount of the line memory is allocated for the image shifting unit 216, the number of lines where shifting can be performed by the image shifting unit 216 may increase.

In particular, the image shifting unit 216 deals with the image data whose resolution has been changed by the image resolution changing unit 215. Thus, even if line memory is allocated for one main scanning line, twice larger capacity is demanded when the main scanning resolution is doubled, and four times larger capacity is demanded when the main scanning resolution is increased by four times. In other words, if the allocation of the line memory to other modules included in the LEDA writing control circuit 210 is reduced, it becomes possible to allocate the demanded capacity of line memory to the image shifting unit 216 without increasing the total capacity of the RAM 203.

In designing an image forming apparatus, the controller 20, the writing controller 201, and the LEDA 111 may be disposed separately. For example, the designing of the controller 20 and the LEDA 111 may be completed first, and the writing controller 201 is arranged to have a function to intervene between the controller 20 and the LEDA 111.

In such a case, the LEDA writing control circuit 210 to be built in the writing controller 201 is configured by an FPGA to achieve a flexible design. However, the cost increases in geometric progression as the circuit scale of an FPGA increases. The cost of the RAM 203 is high as described above. For this reason, it is preferred that the circuit scale of the LEDA writing control circuit 210 and the capable of the RAM 203 be reduced as much as possible.

By contrast, in the image forming apparatus 1 according to an example embodiment of the present invention, image processing such as shifting, trimming, and skew correction, which are conventionally performed on the print engine 26 side, is performed by using the page memory 35 that is generally provided for the controller 20. Accordingly, the scale of the writing controller 201 of the print engine 26 can be reduced, and processing with capacity as large as the amount equivalent to one page may be achieved, as aimed above. In other words, more preferable processing can be achieved than processing in a configuration where the processes as described above are performed by the writing controller 201.

In the example embodiment described above, the optical writing device 200 with the LEDA 111 has been described. However, the present embodiment may be applied to any image forming mechanism in which image processing such as skew correction is performed. In other words, the present embodiment may also be applied to an organic EL (Electroluminesence) head, an LD (Laser Diode) array head, or a solid-state scanning write head such as a vertical-cavity surface-emitting laser, in a similar manner to the LEDA 111.

Further, the application of the embodiment is not limited to a particular electrophotographic method. The embodiment may be applied to any image forming mechanism that forms an image in scanning lines such as the main scanning line. As long as an image forming mechanism that uses an image processing function such as a skew correction function is used, the embodiment may be applied even to an ink-jet printing system that does not include the optical writing device 200 and the image forming units 106 that include the photoreceptor drums 109.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image forming control device configured to control an image forming apparatus that forms an image at every scanning line, the image forming control device comprising:
   a pixel data generation controller configured to,
      receive data of an image to be formed and an instruction for image formation, and
      generate pixel data to be input to an image forming mechanism that forms an image on a recording medium, the generated pixel data including data of each pixel that makes up the image to be formed; and
   an image forming mechanism controller configured to control image formation performed by the image forming mechanism according to the generated pixel data,
   wherein the pixel data generation controller includes,
      a page memory configured to hold the generated pixel data of the image to be formed, in pages, and
      a pixel data output unit configured to read and output the generated pixel data stored in the page memory upon shifting a main scanning line from which a pixel is read at a specified position on the main scanning line to a sub scanning direction to correct a first image skew, based on information received from the image forming mechanism controller related to image skew caused by a state in which the image forming mechanism is installed, and
   wherein the image forming mechanism controller is configured to,
      further control the image formation by generating an adjustment parameter to correct a second image skew related to variable conditions caused by a state in which the image forming apparatus operates,
      determine, after the second image skew is corrected, a change in a resolution according to which the generated pixel data is to be read, based on a resolution of the image forming mechanism,
      read the generated pixel data from a line memory on which the generated pixel data is stored, the image forming mechanism controller reading the generated pixel data for a number of times, the number of times being based on the determined change in the resolution, the line memory being configured to hold the generated pixel data for every main scanning line, and adjust a timing with which the generated pixel data stored in the line memory is read upon determining the change in the resolution and according to image misalignment information output from the image forming mechanism, the timing being adjusted in order to correct misalignment in a main scanning direction and the sub-scanning direction in units of post-changed resolution.

2. The image forming control device according to claim 1, wherein
information related to the second image skew is generated from reading a specific image pattern formed by the image forming mechanism, and
the pixel data generation controller includes a pattern generation unit configured to generate pixel data for drawing the specific image pattern and store the pixel data for drawing the specific image pattern in the page memory.

3. The image forming control device according to claim 2, wherein when the pixel data for drawing the specific image pattern is stored in the line memory, the pixel data output unit is configured to read and output the generated pixel data upon shifting the main scanning line from which the generated pixel data is read at the specified position on the main scanning line to the sub scanning direction to correct the second image skew.

4. An image forming apparatus comprising:
the image forming control device according to claim 1.

5. The image forming control device according to claim 1, wherein the variable conditions include at least one of a manner of using the image forming apparatus and a location in which the image forming apparatus is used.

6. A method of controlling an image forming apparatus that forms an image at every scanning line, the image forming apparatus including a pixel data generation controller and an image forming mechanism controller, the method comprising:
receiving, at the pixel data generation controller, data of an image to be formed and an instruction for image formation;
generating, at the pixel data generation controller, pixel data to be input to an image forming mechanism that forms an image on a recording medium, the generated pixel data including data of each pixel that makes up the image to be formed;
storing, in a page memory at the pixel data generation controller, pixel data of the image to be formed, in pages;
reading and outputting, at the pixel data generation controller, the pixel data stored in the page memory upon shifting a main scanning line from which a pixel is read at a specified position on the main scanning line to a sub scanning direction to correct a first image skew, based on information received from the image forming mechanism controller, related to image skew caused by a state in which the image forming mechanism is installed; and
controlling, at the image forming mechanism controller, an image forming mechanism to perform image formation according to the pixel data read and output from the page memory as well as an adjustment parameter, the adjustment parameter correcting a second image skew caused by a state in which the image forming apparatus operates;
determining, after the second image skew is corrected, a change in a resolution according to which the generated pixel data is to be read, based on a resolution of the image forming mechanism;
reading the generated pixel data from a line memory on which the generated pixel data is stored, the image forming mechanism controller reading the generated pixel data for a number of times, the number of times being based on the determined change in the resolution, the line memory being configured to hold the generated pixel data for every main scanning line; and
adjusting a timing with which the generated pixel data stored in the line memory is read upon determining the change in the resolution and according to image misalignment information output from the image forming mechanism, the timing being adjusted in order to correct misalignment in a main scanning direction and the sub-scanning direction in units of post-changed resolution.

7. The method according to claim 6, wherein
information related to the second image skew is generated based on a result of reading a specific image pattern, and
the method further comprises:
generating, at the pixel data generation controller, pixel data for drawing the specific image pattern; and
storing, at the pixel data generation controller, the pixel data for drawing the specific image pattern in the page memory.

8. The method according to claim 7, wherein when the pixel data for drawing the specific image pattern is stored in the line memory, the method includes:
reading and outputting, at the pixel data generation controller, the generated pixel data upon shifting the main scanning line from which the generated pixel data is read at the specified position on the main scanning line to the sub scanning direction to correct the second image skew.

9. The method according to claim 6, wherein the variable conditions include at least one of a manner of using the image forming apparatus and a location in which the image forming apparatus is used.

* * * * *